United States Patent [19]
Coughlin

[11] 3,990,728
[45] Nov. 9, 1976

[54] HOSE COUPLING
[75] Inventor: Kenneth J. Coughlin, Rockford, Ill.
[73] Assignee: The Gates Rubber Company, Denver, Colo.
[22] Filed: Oct. 20, 1975
[21] Appl. No.: 623,704

[52] U.S. Cl. .................... 285/40; 285/114; 285/149; 285/259
[51] Int. Cl.² ........................................ F16L 35/00
[58] Field of Search ............ 285/40, 251, 256, 259, 285/149, 114

[56] References Cited
UNITED STATES PATENTS
2,816,781 12/1957 Woodling .................... 285/251 X
2,965,395 12/1960 Schmohl et al. ............. 285/251 X
3,287,033 11/1966 Currie ........................ 285/40

FOREIGN PATENTS OR APPLICATIONS
1,136,935 1/1959 France ........................ 285/259

Primary Examiner—Dave W. Arola
Attorney, Agent, or Firm—H. W. Oberg, Jr.; Raymond Fink; Curtis H. Castleman, Jr.

[57] ABSTRACT

A socket of a hose coupling for use with a nipple, the socket and nipple defining an annular space for receiving and gripping an end of a flexible hose. The socket has a first threaded portion with substantially sharp threads and a helically spaced second threaded portion with a sharp starting thread followed by blunt threads.

8 Claims, 3 Drawing Figures

HOSE COUPLING

BACKGROUND OF THE INVENTION

The invention relates to pipe joints or couplings with assembly means that feature thread cutting means, but more particularly, the invention relates to hose couplings of the socket and nipple type for coupling hose which has a tube and cover of rubber-like material which sandwich a reinforcement of one or more layers.

Hose couplings fall in two general categories. The couplings are either of the permanent type whose useful service typically corresponds to the life of the hose, or the couplings are the reusable type which may be employed several times with one or more hoses.

Reusable couplings of the socket and nipple type also fall within two categories even though the socket of each includes internal threads for gripping the hose reinforcement. Couplings of the first type require modifying the hose by removing the cover before the socket may be inserted over the end of the hose. Couplings of the second type require no removal of the cover prior to application of the socket through the end of a hose. These couplings are referred to as requiring no skiving and this is the type of coupling to which this invention is directed. Examples of such couplings are disclosed in U.S. Pat. Nos. 2,965,395 and 3,287,033. While such couplings as disclosed by these patents are commercially satisfactory, they do not provide means for strain relief of the hose cover during application of the cover or during hose service, nor do they provide a flaring type distention of the reinforcement near the hose end of the socket for improved coupling retention.

SUMMARY OF THE INVENTION

In accordance with the invention, a socket is provided for use with a nipple to define an annular area therebetween for receiving and gripping the end of a hose which includes a tube, reinforcement, and cover. The socket has internal threads along its internal diameter which includes a first threaded portion with sharp threads and a helically spaced second threaded portion which includes a sharp starting thread followed by blunt threads. The space between the first and second threaded portions define a relief in the socket for receiving distended portions of the hose while the sharp starting thread of the second threaded portion provides a means for strain relieving the hose cover.

Accordingly, an object of the invention is to provide a socket which has a relief portion for receiving a distended portion of a hose near the open end of the socket.

Another object of the invention is to provide a "noskive" coupling that provides strain relief of the cover during application of the socket onto the hose.

Another object of the invention is to provide a socket for a hose coupling which makes a double helical slit in a portion of a hose cover.

An advantage of the invention is that the helical space between the first and second threaded portions provide for tool reversal during manufacture.

These and other objects or advantages of the invention will be apparent after reviewing the drawings and description thereof wherein.

DESCRIPTION OF PREFERRED EMBODIMENTS

Figure 1:
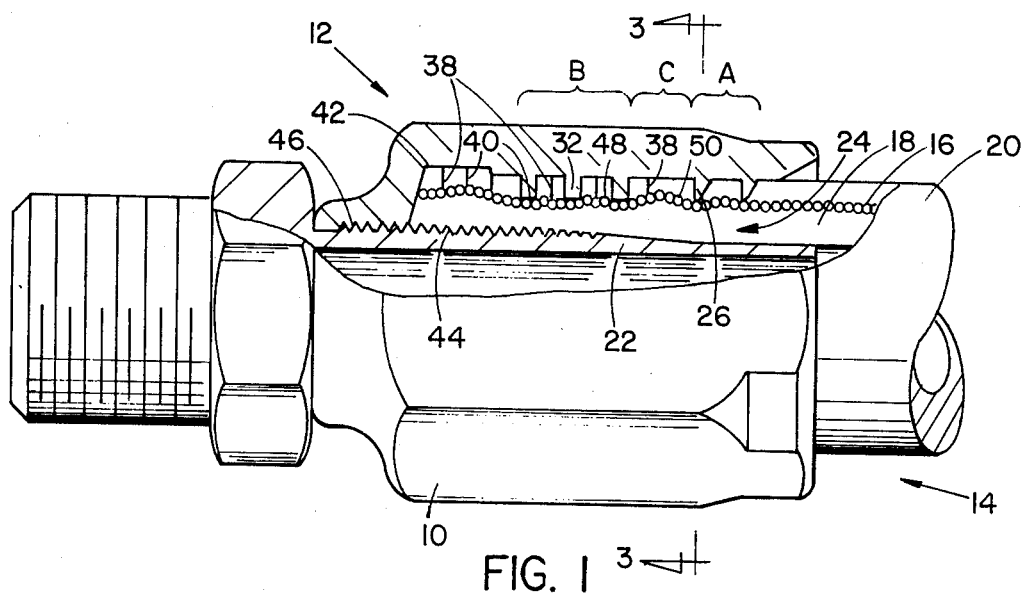
FIG. 1 is an axial partially cutaway view showing the socket of the invention and a nipple applied to the end portion of a piece of hose.
Figure 2:
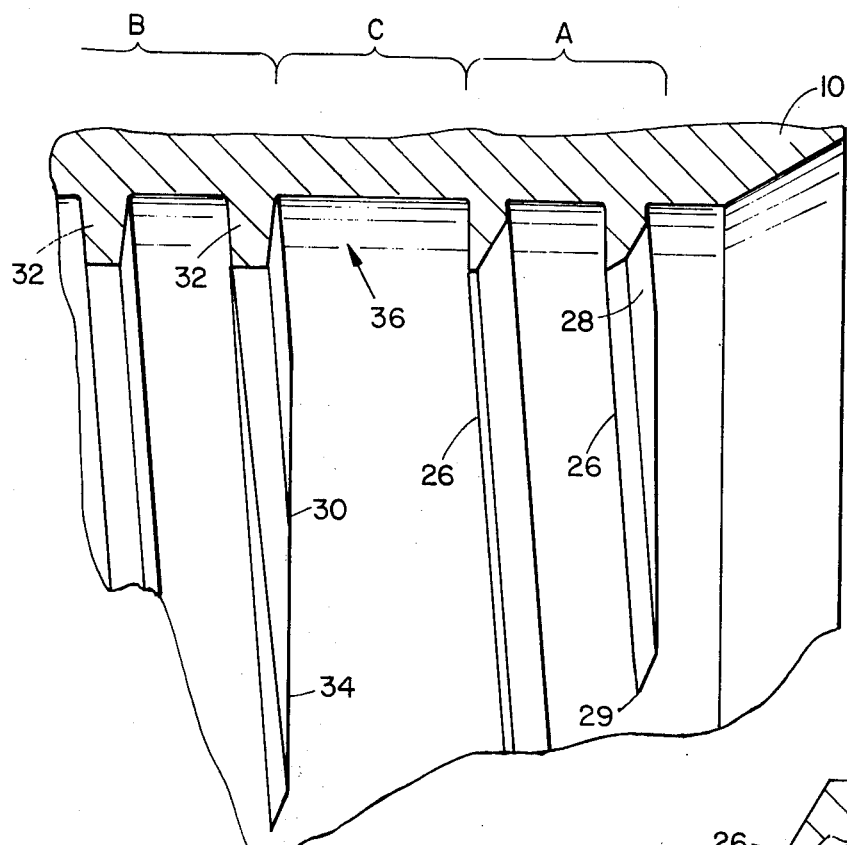
FIG. 2 is an enlarged fragmentary section view of the socket taken generally along the line 2-2 of FIG. 3.
Figure 3:
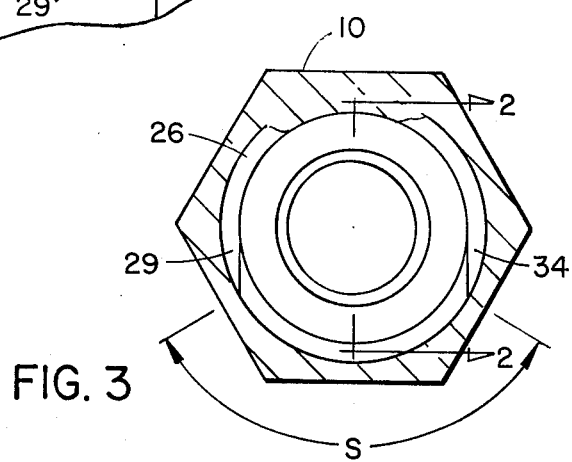
FIG. 3 is a cross sectional view taken generally along the line 3—3 of FIG. 1.

Referring to the drawings, a socket 10 of a reusable coupling 12 is provided for use with a flexible hose 14 that includes a reinforcement 16 disposed between a tube 18 and cover 20. The assembled coupling 12 includes a tapered nipple 22 and the socket which together define a tapered annular volume 24 for receiving and gripping the end of the hose.

The socket 10 has two internally threaded portions A, B along its hose receiving bore. The first threaded portion A comprises one or more, preferably generally two, generally sharp threads 26. The initial thread defines a first hose cover cutting edge 29 of which the initial thread may have an additional bevel 28 to relieve its diameter. The generally sharp cross section of the threads, as well as the beveled first threads is known in the above cited art. Consequently, details concerning the construction of the threads are hereby incorporated by reference.

The second threaded portion B of the socket is helically spaced C from the first threaded portion. Preferably, the second threaded portion starts generally ½ to 1 thread away S from the end of the first threaded portion. The second threaded portion may start generally as little as one-fourth or more than one full thread lengths away from the end of the first threaded portion.

The second threaded portion has a starting thread 30 which is sharp (i.e., has a generally sharp cross section) and which changes to a blunt thread 32 (i.e., having a generally blunt cross section). The bluntness of the thread and the details of its construction are known in the above cited art and to this end, these patents are hereby incorporated by reference.

The sharp starting thread 30 of the second threaded portion B may be made with a generally radial cut. The cut tapers the thread along its length to make a sharpened wedge 34. The sharp starting thread need not have the triangular sharpened cross section of the first threaded portion. The sharpened thread need extend only along a portion of a thread length. This may be, for example, one-fourth a thread length.

The helical space C between the first and second threaded portions define a relief concavity 36 in the socket for receiving distended portions of a hose end when coupled.

The first and second threaded portions may, and preferably, are on the same general helix. However, the second threaded portion may be slightly transposed along a second helix.

During coupling assembly, the socket is threaded on the hose end. The first cutting edge 29 and the sharp threads 26 of the first threaded portion A slice into the cover to form a first helical slit 38 therein. Further threading of the coupling over the hose engages the sharp starting thread 34 of the second threaded portion B. Because of the elastomeric nature of the hose, the starting thread cuts a second helical slit 40 in the hose cover even though the first and second threaded portions are on the same helix. The socket is further positioned over the hose end until it bottoms in the socket adjacent a relief undercut 42. The blunt threads 32 are disposed in the second slit 40 while the sharp threads 26 of the initially threaded portion are disposed in the first slit 38. However, the first slit 38 is interpositioned between the blunt threads 32 of the second threaded portion. The interpositioned first slit provides strain relieve of the cover.

The nipple 22 is inserted into the socket and threaded into position by means of an external thread 44 on the nipple and an internal thread 46 on the socket. As the tapered nipple advances into the bore of the tube, it expands the hose so that the cover 20 substantially completely fills the spaces between the first and secondary threaded portions A, B so that the reinforcement 16, which is usually wire, is forced tightly against the blunt threads. The pressure of the tapered nipple against the hose tube insures a hydraulic seal.

The advancement of the tapered nipple may induce shear of the cover where there are two slits. This permits easy displacement of the cover into the area between the blunt threads.

The pressure exerted by the tapered nipple expands the end of the hose into the undercut relief 42 while also arching 48 some of the reinforcement between the threads which helps retain the coupling.

The unthreaded portion between the first and second threaded portions define the relief 36 for receiving further distended portions 50 of the tube, reinforcement and cover beyond that arching achieved between successively adjacent threads. The distended portion which extends along at least a circumferential portion of the socket, helps further to retain the coupling while simultaneously strain relieving the tube and reinforcement near the end of a socket. The strain relief allows for a greater stress change between the highly stressed blunt threads to the more lowly stressed sharpened thread. Reduced stress occurs because the relief 36 defines a volume for distention of the hose without respondingly high increases in clamping force. The highest clamping force is near the last square thread of the coupling where the radial distance between the tapered nipple and thread are minimum.

The foregoing description is provided for the purpose of illustration only and is not intended to limit the scope of the invention which is to be determined from the appended claims.

What is claimed is:

1. A socket for a hose coupling of the type having one end for receiving a nipple and an internally threaded open end for receiving a wire reinforced hose with cover, wherein improvement of the internal threads consists essentially of:
   a first threaded portion with threads that are relatively sharp in cross section, the starting thread of which define a first hose cover cutting edge;
   a second threaded portion inward and discontinuously spaced from about one-fourth to about one thread from the first threaded portion to define an unthreaded space, the threads of the second portion starting with a thread portion of relatively sharp cross section that defines a second hose cover cutting edge and which changes to threads of relatively blunt cross section, the first and second thread portions of substantially the same pitch and the discontinuous space between the first and second thread portions defining a relief cavity.

2. A socket as set forth in claim 1 wherein the first and second threaded portions are on substantially the same helix.

3. the socket as claimed in claim 1 wherein the unthreaded space is at least generally one-fourth of a thread.

4. The socket as claimed in claim 1 wherein the first and second threaded portions are on two different helixes.

5. In a hose coupling of the type having a nipple and an internally threaded socket that defines an annular volume for gripping the end of a flexible hose that has a reinforcement disposed between a tube and cover, the improvement in the internal socket threads consists essentially of:
   a first internally threaded portion near one end of the socket with threads of relatively sharp cross section for cutting a first helical slit in the cover;
   a second internally threaded portion discontinuous and helically spaced from about one-fourth to about one thread from the first threaded portion to define an unthreaded space for receiving a distended portion of the cover, reinforcement and tube, the second threaded portion starting with a thread of relatively sharp cross section that change to threads of relatively blunt cross section, the sharp threads for cutting a second slit for receiving the blunt threads.

6. The hose coupling of claim 5 wherein the first and second threaded portions are substantially on the same helix.

7. In combination, a hose coupling and a flexible hose which has a reinforcement between a tube and cover, the coupling of the type having a nipple and an internally threaded socket that defines an annular volume for gripping the end of the hose, wherein the improvement consists essentially of:
   a first internally threaded portion of and near one end of the socket with threads of relatively sharp cross section for cutting a first helical slit in the cover, the threads of the first threaded portion disposed in part of the first helical slit;
   a second internally threaded portion of the socket discontinuous and helically spaced from about one-fourth to about one thread from the first threaded portion to define an unthreaded space that receives a distended portion of the cover, reinforcement and tube, the second threaded portion starting with a relatively sharp thread that changes to blunt threads, the sharp thread for cutting a second slit in the cover that receives the blunt threads, the reinforcement positioned tightly against the blunt threads;
   whereby, the first slit allows strain relief of the cover near the blunt threads and the distended portion of the tube, cover and reinforcement define an added coupling retention means.

8. The combination of claim 7 wherein the first and second threaded portions are substantially on the same helix.

* * * * *